с
US011030117B2

(12) United States Patent
Jayasena et al.

(10) Patent No.: US 11,030,117 B2
(45) Date of Patent: Jun. 8, 2021

(54) PROTECTING HOST MEMORY FROM ACCESS BY UNTRUSTED ACCELERATORS

(71) Applicant: Advanced Micro Devices, Inc., Sunnyvale, CA (US)

(72) Inventors: Nuwan Jayasena, Sunnyvale, CA (US); Brandon K. Potter, Austin, TX (US); Andrew G. Kegel, Bellevue, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 115 days.

(21) Appl. No.: 15/650,252

(22) Filed: Jul. 14, 2017

(65) Prior Publication Data

US 2019/0018800 A1    Jan. 17, 2019

(51) Int. Cl.
*G06F 12/14* (2006.01)
*G06F 12/10* (2016.01)
(Continued)

(52) U.S. Cl.
CPC ...... *G06F 12/1408* (2013.01); *G06F 9/45558* (2013.01); *G06F 9/4856* (2013.01); *G06F 9/5077* (2013.01); *G06F 12/0875* (2013.01); *G06F 12/10* (2013.01); *G06F 12/1491* (2013.01); *G06F 2009/45587* (2013.01)

(58) Field of Classification Search
CPC ........ G06F 3/0613; G06F 8/63; G06F 9/5027; G06F 12/1009; G06F 12/1408; G06F 9/4881; G06F 12/14; G06F 12/08; G06F 12/0875; G06F 12/1081; G06F 12/10; G06F 12/1491; G06F 12/1027; G06F 15/7807; G06F 9/45558; G06F 9/4856;
(Continued)

(56) References Cited

U.S. PATENT DOCUMENTS

| 10,303,621 B1* | 5/2019 | Diamant ............. G06F 15/7807 |
| 2003/0097394 A1* | 5/2003 | Chauvel ............. G06F 12/1036 718/100 |

(Continued)

OTHER PUBLICATIONS

Protecting Host Systems From Imperfect Hardware Accelerators by Lena E. Olson University of Wisconsin—Madison (Aug. 17, 2016), pp. 170 (Year: 2016).*

(Continued)

*Primary Examiner* — Samson B Lemma
*Assistant Examiner* — Ali H. Cheema

(57) ABSTRACT

A host processor receives an address translation request from an accelerator, which may be trusted or un-trusted. The address translation request includes a virtual address in a virtual address space that is shared by the host processor and the accelerator. The host processor encrypts a physical address in a host memory indicated by the virtual address in response to the accelerator being permitted to access the physical address. The host processor then provides the encrypted physical address to the accelerator. The accelerator provides memory access requests including the encrypted physical address to the host processor, which decrypts the physical address and selectively accesses a location in the host memory indicated by the decrypted physical address depending upon whether the accelerator is permitted to access the location indicated by the decrypted physical address.

20 Claims, 5 Drawing Sheets

(51) Int. Cl.
*G06F 9/48* (2006.01)
*G06F 9/455* (2018.01)
*G06F 12/0875* (2016.01)
*G06F 9/50* (2006.01)

(58) Field of Classification Search
CPC ......... G06F 9/5077; G06F 2009/45587; H04L 67/06; H04L 9/3234
USPC .......... 726/12; 713/171, 189, 190, 193, 150, 713/160, 163; 718/102; 711/207
See application file for complete search history.

(56) References Cited

U.S. PATENT DOCUMENTS

| | | | | |
|---|---|---|---|---|
| 2008/0229117 A1* | 9/2008 | Shin | ...................... | G06F 21/123 713/190 |
| 2008/0288785 A1* | 11/2008 | Rao | .................... | G06F 12/1408 713/190 |
| 2011/0072234 A1* | 3/2011 | Chinya | ................. | G06F 12/121 711/207 |
| 2011/0239003 A1* | 9/2011 | Archer | ................. | G06F 9/5027 713/189 |
| 2012/0303948 A1* | 11/2012 | Auernhammer | .... | G06F 12/1081 713/150 |
| 2013/0111211 A1* | 5/2013 | Winslow | ............... | H04L 9/3234 713/171 |
| 2014/0359629 A1* | 12/2014 | Ronen | ................... | G06F 9/4881 718/102 |
| 2015/0046702 A1* | 2/2015 | Paaske | ................... | G06F 21/85 713/160 |
| 2015/0067819 A1* | 3/2015 | Shribman | ............... | H04L 67/06 726/12 |
| 2015/0248357 A1* | 9/2015 | Kaplan | ............... | G06F 9/45558 713/193 |
| 2015/0301761 A1* | 10/2015 | Sijstermans | .......... | G06F 3/0644 711/163 |
| 2016/0306746 A1* | 10/2016 | Podaima | ............. | G06F 12/1027 |
| 2016/0315874 A1* | 10/2016 | Medovich | ........... | H04L 61/2503 |
| 2016/0344731 A1* | 11/2016 | Serebrin | ................. | G06F 12/1081 |
| 2017/0123999 A1* | 5/2017 | Aslot | ................. | G06F 12/1009 |
| 2018/0157596 A1* | 6/2018 | Amit | ................... | G06F 12/1009 |
| 2018/0247082 A1* | 8/2018 | Durham | .................... | G06F 8/63 |
| 2018/0335956 A1* | 11/2018 | Iyer | ....................... | G06F 3/0613 |
| 2019/0114197 A1* | 4/2019 | Gong | ................. | G06F 9/45558 |

OTHER PUBLICATIONS

Border Control: Sandboxing Accelerators by Lena E. Olson, Jason Power, Mark D. Hill and David A. Wood University of Wisconsin—Madison Computer Sciences Department, Date of Conference: Dec. 5-9, 2015 (IEEE) pp. 12; (Year: 2015).*

Detecting Peripheral-based Attacks on the Host Memory by Patrick Stewin (Technische Universität Berlin, Berlin, Germany) pp. 118; Published in (Year: 2015).*

Gen-Z Consortium website, Gen-Z Consortium Draft Core Specification, Sections 3.2.9, 3.2.10, and 12.7.7, 9 pages, http://genzconsortium.org/specifications/, Dec. 2016.

Olson, Lena E., et al. "Border Control: Sandboxing Accelerators". Micro-48, Proceedings of the 48th International Symposium on Microarchitecture, Dec. 5-9, 2015, Waikiki, HI, 12 pages.

Gen-Z Consortium website, Gen-Z Introduction and Executive Summary, "Gen-Z Overview", 8 pages, http://genzconsortium.org/, 2016.

* cited by examiner

| TRANSLATION LOOKASIDE BUFFER 300 | | |
|---|---|---|
| VADDR_1 | ENCRYPTED PADDR_1 | |
| VADDR_2 | ENCRYPTED PADDR_2 | |
| VADDR_3 | ENCRYPTED PADDR_3 | |
| ... | ... | |
| VADDR_N | ENCRYPTED PADDR_N | |

FIG. 3

PROTECTING HOST MEMORY FROM ACCESS BY UNTRUSTED ACCELERATORS

BACKGROUND

The performance of processing systems can be enhanced by incorporating specialized processors (referred to hereinafter as accelerators) to supplement the processing power of conventional central processing units (CPUs). Examples of accelerators include graphics processing units (GPUs), special-purpose CPUs, field programmable gate arrays (FPGAs), application-specific accelerators such as Google's TensorFlow processing unit (TPU) that is configured for machine learning and artificial intelligence workloads, and the like. The efficiency of the accelerators implemented in a processing system is improved by providing a single virtual address space (and corresponding physical address space) that can be accessed by the accelerators and the general-purpose CPU implemented in the processing system. For example, implementing a single, shared virtual and physical address space enables multiple devices (such as an accelerator and a CPU) to access the same information without explicit and expensive data copies between segregated memory spaces associated with the multiple devices. For another example, a shared address space can support complex data structures that include embedded pointers without requiring deep copies of the data structures or the use of cumbersome offset-based indexing at the application level.

BRIEF DESCRIPTION OF THE DRAWINGS

The present disclosure can be better understood, and its numerous features and advantages made apparent to those skilled in the art by referencing the accompanying drawings. The use of the same reference symbols in different drawings indicates similar or identical items.

FIG. 3 is a block diagram of a translation lookaside buffer that is implemented in an accelerator according to some embodiments.

DETAILED DESCRIPTION

Figure 1:
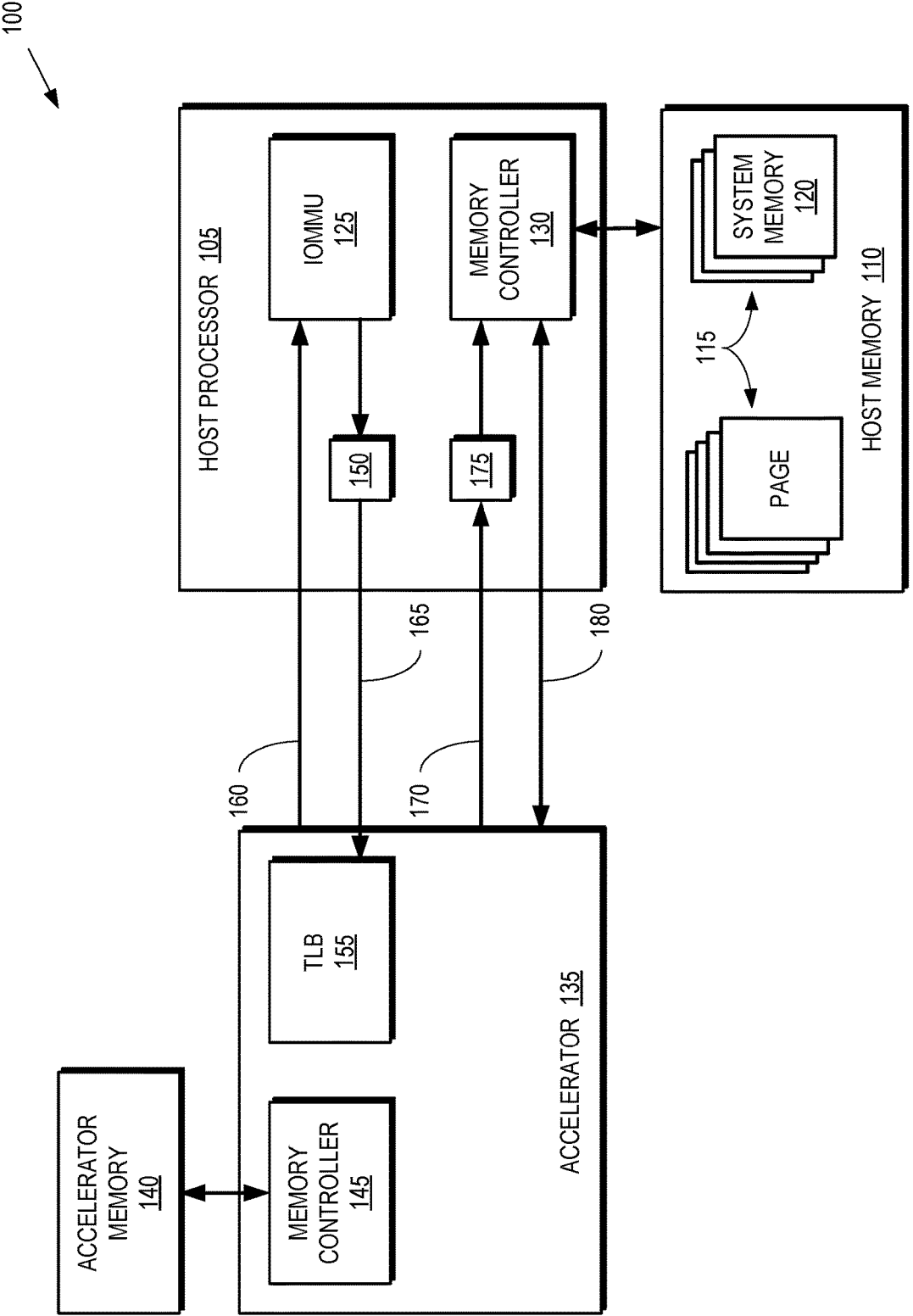
FIG. 1 is a block diagram of a processing system according to some embodiments.

Accelerators are not necessarily trusted by the processing system that incorporates the accelerators. An un-trusted accelerator that is given access to a shared address space that includes the system memory of the CPU could (intentionally or unintentionally) compromise data in the system memory, including hypervisor or operating system (OS) data structures, which could render the processing system vulnerable to exploitation or inoperable. For example, the un-trusted accelerator could request translation of a virtual page address to a physical page address from an input/output memory management unit (IOMMU), which can return the requested physical page address in response to verifying that the accelerator has permission to access the physical page in the shared address space. However, the accelerator could subsequently use the physical address to access other physical pages, e.g. by reading or writing beyond the boundaries of the requested physical page in violation of the permissions granted to the accelerator. The unauthorized memory accesses could be the result of implementation bugs, lack of support for memory protections, malicious behavior, and the like.

Processing systems that allow accelerators and trusted CPUs to access the same virtual and physical address space typically require that the accelerator establish a trusted relationship with the CPU before they are granted access to the memory. However, this approach can prevent third-party accelerators and other forms of potentially un-trusted accelerators, such as FPGAs that run user-defined operations, from utilizing the memory, thereby limiting performance of the processing system. In some cases, the system can require that accelerators issue requests using virtual addresses that are translated by the host CPU for the system memory encompassed by the shared address space. Although this allows the host CPU to prevent accelerators from accessing unauthorized physical addresses, the system is required to perform an address translation every time the accelerator accesses a new cache line in system memory, which requires provisioning sufficient page walker bandwidth and translation lookaside buffer (TLB) capacity. The resulting burden on the system can be prohibitively expensive. For example, a GPU requires thousands of TLB entries for efficient operation. Limiting the accelerator to virtual address requests also forces the accelerator to treat local memory and host memory differently, which can add significant latency to the memory access path because the accelerator may need to traverse its local page tables to determine that the access is to be routed to the host CPU, which then performs another page walk over the CPU page tables.

Un-trusted accelerators can use physical addresses to access the shared address space if the host CPU performs a permission check on every access received from the un-trusted accelerator. The un-trusted accelerators can then maintain separate caches and TLBs. However, the host CPU is required to maintain a large table that includes an entry that indicates the accelerator's permissions for each physical page in the host CPU's memory. Furthermore, additional memory accesses are required to retrieve information from the table and additional hardware structures may be implemented to cache a frequently used subset of the table.

Access to a shared address space can also be controlled by distributing access keys or region keys to trusted accelerators. Access keys are known to, and shared by, a trusted accelerator and a host CPU for the system memory that includes the shared address space. Shared access keys can prevent access to the system memory by an un-trusted accelerator but they cannot be used to allow selective access to a subset of pages in the shared address space by an arbitrary (and potentially un-trusted) accelerator. For example, access keys of this form cannot be used to provide an accelerator access to data in system memory for one application while preventing its access to the rest of system memory. Region keys are used to provide trusted accelerators with access to a specific region within the shared address space, while preventing access to portions of the shared address space that are outside of the region associated with the region key. Using region keys to enforce page-granularity protections requires storing one or more region keys for each physical page in the shared address space, e.g., using a large table. As discussed herein, using secondary tables for access control in addition to the traditional page tables maintained by system software has a number of drawbacks including increasing the number of memory accesses and adding hardware structures such as caches associated with the table.

FIGS. 1-5 describe techniques for tightly and transparently integrating trusted and un-trusted accelerators into a processing system hosting a memory (referred to herein as a "host memory") that is accessible using virtual and physical address spaces that are shared with a host processor by providing encrypted physical addresses to an accelerator in response to an address translation request from the accelerator. The host processor receives the address translation request including a virtual address in the host memory region of the shared virtual address space. The host processor determines whether the accelerator is permitted to access the physical address indicated by the virtual address. If so, the host processor encrypts the physical address using a secret key that is not known by the accelerator and transmits the encrypted physical address to the accelerator. Some embodiments of the host processor append a checksum or metadata including information indicating permissions associated with the accelerator to the physical address prior to encryption so that the encrypted physical address includes encrypted values of the checksum or the metadata.

The accelerator stores the encrypted physical address in a local translation lookaside buffer (TLB) so that subsequent virtual addresses within the same page can be translated by the accelerator without issuing further translation requests to the host processor. For example, the accelerator can translate a virtual address to an encrypted physical address stored in the local TLB and then transmit a memory access request including the encrypted physical page address to the host processor, which decrypts the encrypted physical address on the basis of the secret key. The host processor then determines whether the accelerator is permitted to access the physical address. For example, the host processor can recompute the checksum on the basis of the decrypted physical address and compare it to the checksum that is recovered from the encrypted physical address. If the two checksums match, the accelerator is permitted to access the physical address. For another example, the host processor can verify that the accelerator is permitted to access the physical address on the basis of metadata recovered from the decrypted physical address.

FIG. 1 is a block diagram of a processing system 100 according to some embodiments. The processing system 100 includes a host processor 105 and a corresponding host memory 110. Some embodiments of the host processor 105 are implemented as a central processing unit (CPU). However, other embodiments of the host processor 105 are implemented as other types of processors such as graphics processing units (GPUs), special-purpose CPUs, field programmable gate arrays (FPGAs), application-specific integrated circuits (ASICs), and the like. Some embodiments of the host memory 105 are implemented as random access memory (RAM) such as dynamic random access memory (DRAM), static random access memory (SRAM), non-volatile random access memory (NVRAM), and the like.

The host memory 110 stores information in pages 115. A portion of the host memory 110 is used as system memory 120 for the host processor 105. The system memory 120 includes one or more pages 115 that store data including operating system (OS) data structures that are used to implement the OS running on the host processor 105 or hypervisor data structures that are used to implement a hypervisor that controls virtual machines executing on the host processor 105. Physical addresses in the host memory 110 are mapped to virtual addresses in one or more virtual address spaces and the mappings define the range of virtual addresses used by the host processor 105 to access locations in the host physical memory 110. The virtual addresses that map to host memory fall within pages 115 in the host memory 110, and each of the pages 115 is a fixed-length contiguous block of virtual memory.

The host processor 105 is configured to translate virtual addresses to physical addresses. In the illustrated embodiment, the host processor 105 includes an input/output memory management unit (IOMMU) 125 that is configured to receive virtual addresses that are provided to the host processor 105 by other devices or components of the processing system 100 that are external to the host processor 105. In other architectures, the host processor 105 can include other functionality to perform the memory management functions performed by the IOMMU 125. The received virtual addresses can be translated to physical addresses that indicate locations in the host memory 110 such as a line of memory elements in the host memory 110. For example, the IOMMU 125 can receive address translation requests from external devices or components. The address translation request includes a virtual address that is to be translated into a physical address. The IOMMU 125 translates the virtual address into a physical address and provides the physical address in response to receiving the address translation request. In some embodiments, the virtual address is a base address of a page in virtual memory and the virtual address does not include less significant bits that identify specific memory locations within the virtual memory page. In that case, the IOMMU 125 returns a base address of the page in physical memory to the requesting device or component. The IOMMU 125 may access page tables maintained by system software that store mappings of the virtual addresses to the physical addresses and may implement associated caches (e.g., translation lookaside buffers) to improve translation performance.

The host processor 105 implements a memory controller 130 to control access to the host memory 110. The memory controller 130 can be implemented in hardware, firmware, software, or any combination thereof. The memory controller 130 is configured to read information from the host memory 110 and write information to the host memory 110. Some embodiments of the memory controller 130 are configured to provide signals to refresh portions of the host memory 110. For example, if the host memory 110 is implemented as a DRAM, the memory controller 130 periodically provides refresh signals to refresh the memory elements implemented in the host memory 110. Reading, writing, and (if implemented) refreshing of the memory elements in the host memory 110 are performed on the basis of physical addresses of locations in the host memory 110. For example, the memory controller 130 can read (or load) information from a location in the host memory 110 indicated by a physical address provided by the IOMMU 125. For another example, the memory controller 130 can write (or store) information to a location in the host memory 110 indicated by a physical address provided by the IOMMU 125.

The processing system 100 also includes an accelerator 135 that is configured to supplement the processing power of the host processor 105. The accelerator 135 can be implemented as a GPU, special-purpose CPU, FPGA, TPU, and the like. Some embodiments of the processing system 100 implement an accelerator memory 140 that is associated with the accelerator 135. The accelerator memory 140 can be implemented using SRAM, DRAM, NVRAM, or other type of memory. The accelerator 135 implements a memory controller 145 to control access to the accelerator memory 140, e.g., by reading, writing, or refreshing memory elements in the accelerator memory 140 on the basis of physical addresses in the accelerator memory 140. The processing system 100 also provides the accelerator 135 with access to the host memory 110 via the host processor 105. The accelerator 135 therefore shares the virtual address space of the host memory 110 with the host processor 105 and the accelerator 135 can provide address translation requests (including a virtual address), memory access requests (including a physical address), and the like to the host processor 105.

The accelerator 135 may or may not have an established trust relationship with the host processor 105. Consequently, the host processor 105 is configured to protect the security and integrity of data stored in the host memory 110 by providing encrypted physical addresses to the accelerator 135 in response to address translation requests. Some embodiments of the host processor 105 include a translation encryption block 150 that encrypts physical addresses prior to providing the encrypted physical address to the accelerator 135. The accelerator 135 can then store a mapping of the virtual address to the encrypted physical address in a translation lookaside buffer (TLB) 155. For example, the accelerator 135 can provide an address translation request 160 including a virtual address to the IOMMU 125, which translates the virtual address to a physical address. The IOMMU 125 provides the physical address to the translation encryption block 150, which encrypts the physical address before providing the encrypted physical address to the accelerator 135 (at arrow 165). As discussed herein, some embodiments of the encrypted physical address include additional information such as a checksum or metadata.

In some embodiments, the encrypted physical address is provided to the accelerator 135 as part of a tuple that includes the encrypted physical address and the unencrypted physical address. The accelerator 135 stores the encrypted physical address and the unencrypted physical address in the TLB 155. In that case, the accelerator 135 is required to provide the encrypted physical address in memory access requests or cache coherence probes that are sent to the host processor 105. However, cache coherence probes from the host processor 105 to the accelerator 135 can be transmitted using the unencrypted physical address. The accelerator 135 can also use the unencrypted physical address internally for cache tagging and maintaining cache coherence. Providing the unencrypted physical address in the tuple avoids complexities associated with synonyms and cache coherence even when the encrypted physical address includes process specific metadata, as discussed below.

The host processor 105 is also configured to verify that the accelerator 135 is authorized to access physical addresses indicated in memory access requests on the basis of the information included in an encrypted physical address transmitted by the accelerator 135 in the memory access request. For example, the accelerator 135 can determine an encrypted physical address corresponding to a virtual address using information stored in the TLB 155. The accelerator 135 then generates a memory access request including the encrypted physical address and transmits the memory access request 170 to the host processor 105. An access permission checker 175 receives the memory access request 170, decrypts the encrypted physical address to form a decrypted physical address, and selectively accesses a location in the host memory 110 indicated by the decrypted physical address depending upon whether the accelerator 135 is permitted to access the location indicated by the decrypted physical address. If the accelerator 135 is permitted to access the host memory 110, the access permission checker 175 provides the physical address to the memory controller 120, which performs the requested access. Requested information, a confirmation signal, or an error signal can be returned to the accelerator 135 (at arrow 180). Although the signals 160, 165, 170, 180 are depicted as traveling along different logical paths in FIG. 1, the signals 160, 165, 170, 180 can be transmitted over the same physical pathway, such as the same bus or communication fabric.

As discussed herein, some embodiments of the accelerator 135 provide address translation requests that include a base address of a page in virtual memory. In that case, the IOMMU 125 translates the base address of the virtual memory page to a base address of a corresponding physical page 115 in the host memory 110. Thus, the encrypted physical address received by the accelerator 135 and stored in the TLB 155 represents a physical address of the corresponding page 115 that has been encrypted by the translation encryption block 150. Subsequent accesses to any location in the corresponding page 115 can be performed without sending an address translation request by combining the cached encrypted physical address with an offset value that indicates the specific location (e.g., a cache line) within the corresponding physical page 115. For example, the base address of a page may be given by address bits [N:12] (which can be encrypted as discussed herein) and the offset within the page may be specified by bits [11:0] for a 4 KB page. The offset value transmitted from the accelerator 135 is not encrypted. Thus, the access permission checker 175 only applies the decryption algorithm to the encrypted physical address of the base page and does not apply the decryption algorithm to the unencrypted offset value.

Although a single accelerator 135 is shown in FIG. 1, some embodiments of the processing system include more than one accelerator. In some embodiments, the host processor 105 performs centralized access checking, e.g., using the access permission checker 175. In other embodiments, multiple access permission checkers are implemented for the multiple accelerators.

Figure 2:
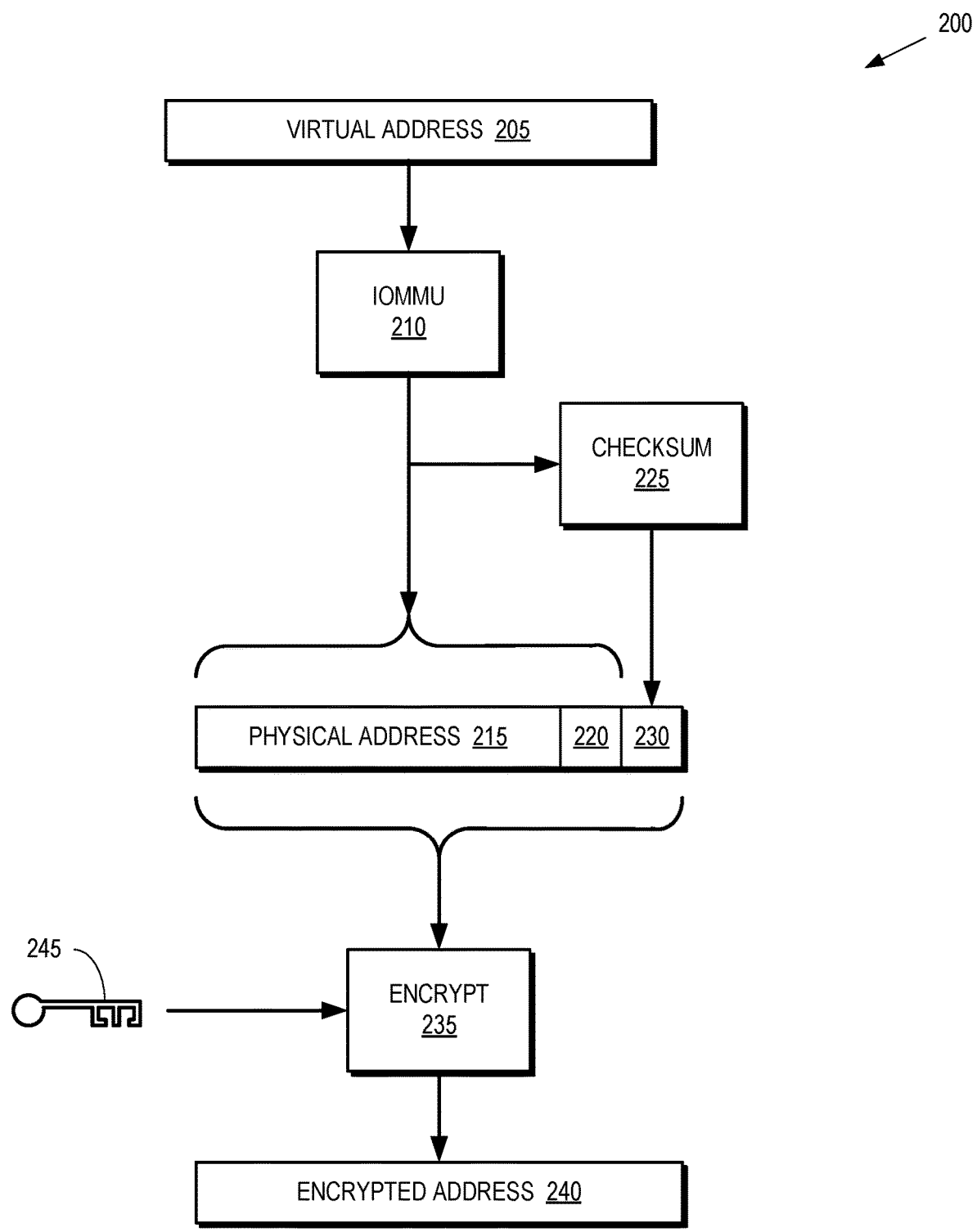
FIG. 2 is a block diagram illustrating a process for translating a virtual address to an encrypted physical address according to some embodiments.

FIG. 2 is a block diagram illustrating a process 200 for translating a virtual address to an encrypted physical address according to some embodiments. The process 200 is implemented in some embodiments of the host processor 105 shown in FIG. 1. A virtual address 205 is provided to an IOMMU 210 such as the IOMMU 125 shown in FIG. 1. For example, the virtual address 205 can be provided to the IOMMU 210 in response to an address translation request being received from an accelerator such as the accelerator 135 shown in FIG. 1.

The IOMMU 210 translates the virtual address to a physical address 215, e.g., by walking a page table or accessing a cached mapping of the virtual address to the physical address from a translation lookaside buffer or other translation cache. Some embodiments of the IOMMU 210 also access metadata 220 that indicate permissions associated with the accelerator that transmitted the address translation request. For example, the metadata can indicate permitted access types (e.g., read-only, write-only, or read-write), a device identifier, process identifier, or other identifier associated with a request for translation (which can be used to ensure that only accesses from the same requester subsequently make use of the translation), an indication such as a bit mask of a subset of the page that the accelerator is allowed to access (e.g., only a requested cache line), and the like. The IOMMU 210 appends the metadata 220 to the physical address 215 prior to encrypting the combined physical address 215 and metadata 220.

Checksum logic 225 generates a checksum 230 based on the physical address information generated by the IOMMU 210. For example, if the IOMMU 210 only generates a physical address 215, the checksum logic 225 determines a checksum 230 on the basis of the values of the bits used to represent the physical address 215. For another example, if the IOMMU 210 appends the metadata 220 to the physical address 215, the checksum logic 225 determines the checksum 230 based on the values of the bits used to represent the physical address 215 and the bits used to represent the metadata 220. The checksum 230 is appended to the physical address 215 and (if present) the metadata 220. The checksum logic 225 can be implemented as hardware, firmware, software, or a combination thereof. In some embodiments, the checksum logic 225 is implemented in the IOMMU 210.

An encryption block 235 is used to encrypt the physical address 215, the metadata 220 (if present), and the checksum 230 to generate an encrypted physical address 240. Encryption is performed on the basis of a secret key 245 that is known to the host processor but is not known to the accelerator. Some embodiments of the encryption block 235 encrypt the physical address information using an asymmetric key cryptography algorithm such as AES, 3DES, DES, Twofish, and the like. The secret key 245 can be renewed periodically or in response to other events. Prior to renewing the secret key 245, the host processor should ensure that any accelerators that include physical addresses that are encrypted using the current value of the secret key 245 are quiescent. Existing cached address translations in accelerators should be invalidated and physically tagged caches in the accelerators should be flushed prior to renewing the secret key 245.

Some embodiments of the encryption block 235 are configured to produce an encrypted physical address 240 that includes a number of bits that is no greater than the largest physical addresses supported by the accelerator. Thus, the accelerator does not need to be specially configured to utilize encrypted physical addresses, nor does the accelerator need to be aware that it is using encrypted physical addresses instead of actual physical addresses. Some embodiments of the encryption block 235 are implemented in the translation encryption block 150 shown in FIG. 1.

FIG. 3 is a block diagram of a translation lookaside buffer 300 that is implemented in an accelerator according to some embodiments. The translation lookaside buffer 300 is used to implement some embodiments of the TLB 155 shown in FIG. 1. The translation lookaside buffer 300 includes information indicating mappings between virtual addresses and encrypted physical addresses. For example, the translation lookaside buffer 300 includes a mapping of a first virtual address (VADDR_1) to a first encrypted physical address (ENCRYPTED PADDR_1). As discussed herein, some embodiments of the translation lookaside buffer 300 store mappings at a page level granularity, e.g., mappings between a virtual address of a page in virtual memory and encrypted physical address that represents a base address of a physical page in memory. Full addresses of locations in the memory are formed by concatenating or otherwise combining the base address of the physical page with an offset inside the page. Some embodiments of the translation lookaside buffer 300 are configured to store unencrypted physical addresses if these addresses are provided as part of a tuple that includes the encrypted physical address and the unencrypted physical address. An accelerator that implements the translation lookaside buffer 300 can use the entry in the translation lookaside buffer 300 to translate the first virtual address (VADDR_1) to the first encrypted physical address (ENCRYPTED PADDR_1), which can be provided to a host processor in a memory access request. As discussed above, the accelerator does not need to be aware that it is using encrypted physical addresses instead of conventional physical addresses.

The translation lookaside buffer 300 supports TLB shootdown on the basis of the virtual addresses. When a virtual-to-physical page mapping is nullified (e.g., OS decides to swap a memory page to disk) or the permissions associated with a page is demoted (e.g., a read/write page is converted to read-only), cached copies of the translation that are stored throughout the system (including the translation lookaside buffer 300) must be invalidated using a TLB shootdown process. To perform TLB shootdown at the translation lookaside buffer 300, the host processor or a component under host control (e.g., IOMMU) sends invalidation messages to the accelerators including the virtual address whose translation is to be invalidated.

Figure 4:
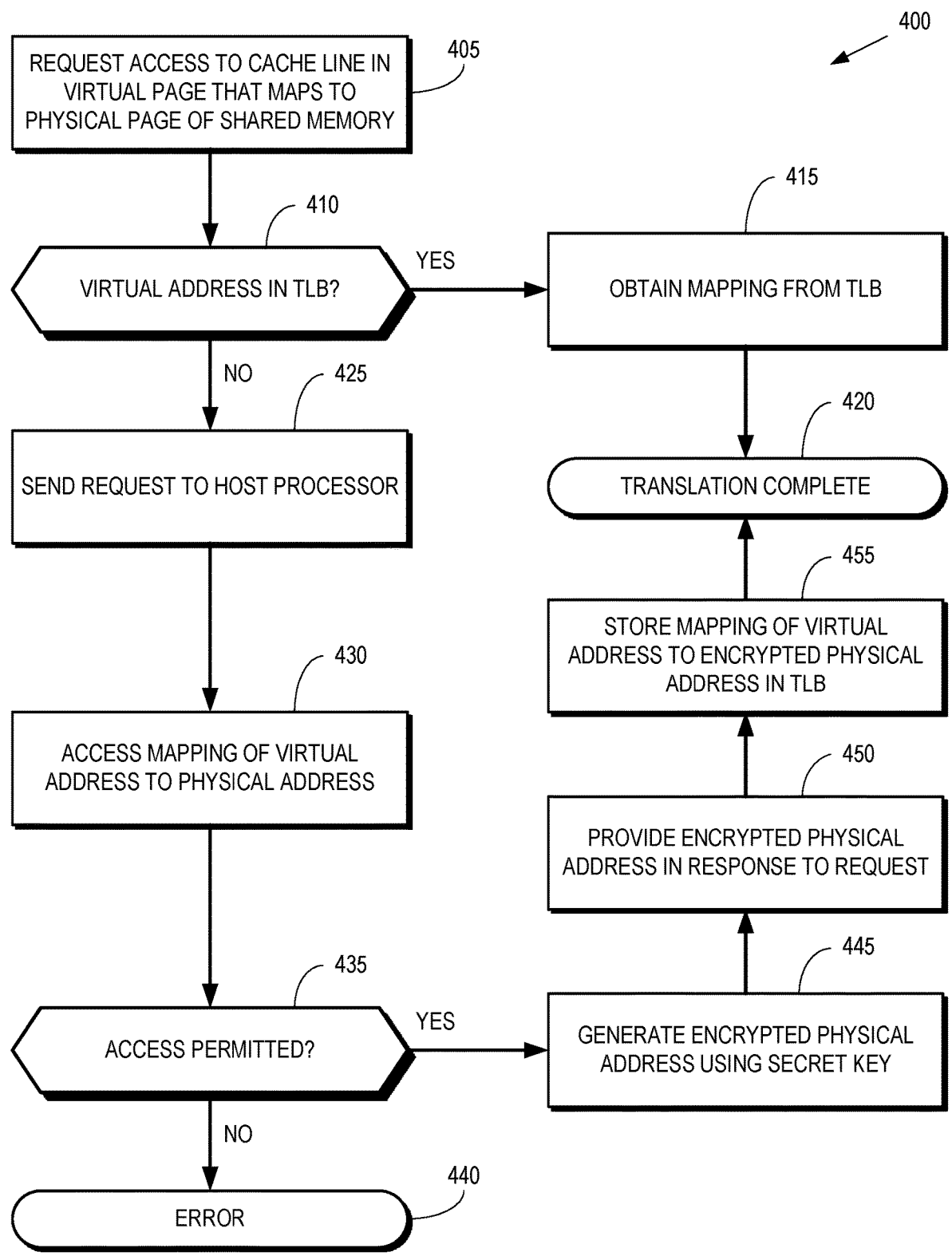
FIG. 4 is a flow diagram of a method of translating virtual addresses to encrypted physical addresses according to some embodiments.

FIG. 4 is a flow diagram of a method 400 of translating virtual addresses to encrypted physical addresses according to some embodiments. The method 400 is implemented in some embodiments of the processing system 100 shown in FIG. 1. For example, an accelerator such as the accelerator 135 shown in FIG. 1 can use the method 400 to obtain translations of virtual addresses from a host processor such as the host processor 105 shown in FIG. 1.

At block 405, the accelerator requests access to a cache line in a page of virtual memory that maps to a physical page of a shared memory such as the host memory 110 shown in FIG. 1. Before transmitting a memory access request to the host memory 110, the accelerator determines (at decision block 410) whether a mapping of the virtual address to an encrypted physical address is present in a TLB implemented by the accelerator. If so, the accelerator does not need to send an address translation request to the host processor. Instead, the accelerator obtains the mapping from its TLB (at block 415) and the translation is complete (at block 420). If the mapping is not present in the TLB, the accelerator sends an address translation request to the host processor (at block 425).

At block 430, the host processor accesses a mapping of the virtual address in the address translation request to a physical address. For example, an IOMMU implemented in the host processor can retrieve the mapping from a local TLB or perform a page table walk to retrieve the mapping from a page table in response to a miss at the local TLB. In some cases, the virtual address may not correspond to a physical address, in which case the host processor can invoke the OS to allocate or retrieve the requested physical address (or page) from backing storage.

At decision block 435, the host processor determines whether the accelerator is permitted to access the location indicated by the physical address. For example, the host processor can determine whether the accelerator is permitted to access the physical page or a subset of the physical page such as a line indicated by the physical address. The host processor determines whether the accelerator is permitted to access the location based on rules, policies, previously established trust relationships, or other conditions that can be established prior to receiving the address translation request. If the accelerator is not permitted to access the physical page, the host processor returns an error message (at block 440). The error message can include a negative acknowledgment or an exception. If the accelerator is permitted to access the physical page, the method 400 flows to block 445.

At block 445, the host processor generates an encrypted physical address using a secret key known to the host processor and not known to the accelerator. As discussed herein, the encrypted physical address includes the physical address indicated by the mapping. The encrypted physical address can also include other information generated by encrypting metadata or a checksum that are appended to the physical address prior to encryption.

At block 450, the host processor provides the encrypted physical address in response to the address translation request received from the accelerator. As discussed herein, in some embodiments, the encrypted physical address can be provided as part of a tuple that includes the encrypted physical address and the unencrypted physical address.

At block 455, the accelerator receives the encrypted physical address and stores the mapping of the virtual address to the encrypted physical address in its TLB. The accelerator can then use the stored mapping to identify the encrypt physical address associated with the virtual address, e.g., for inclusion in memory access requests that are transmitted to the host processor.

Figure 5:
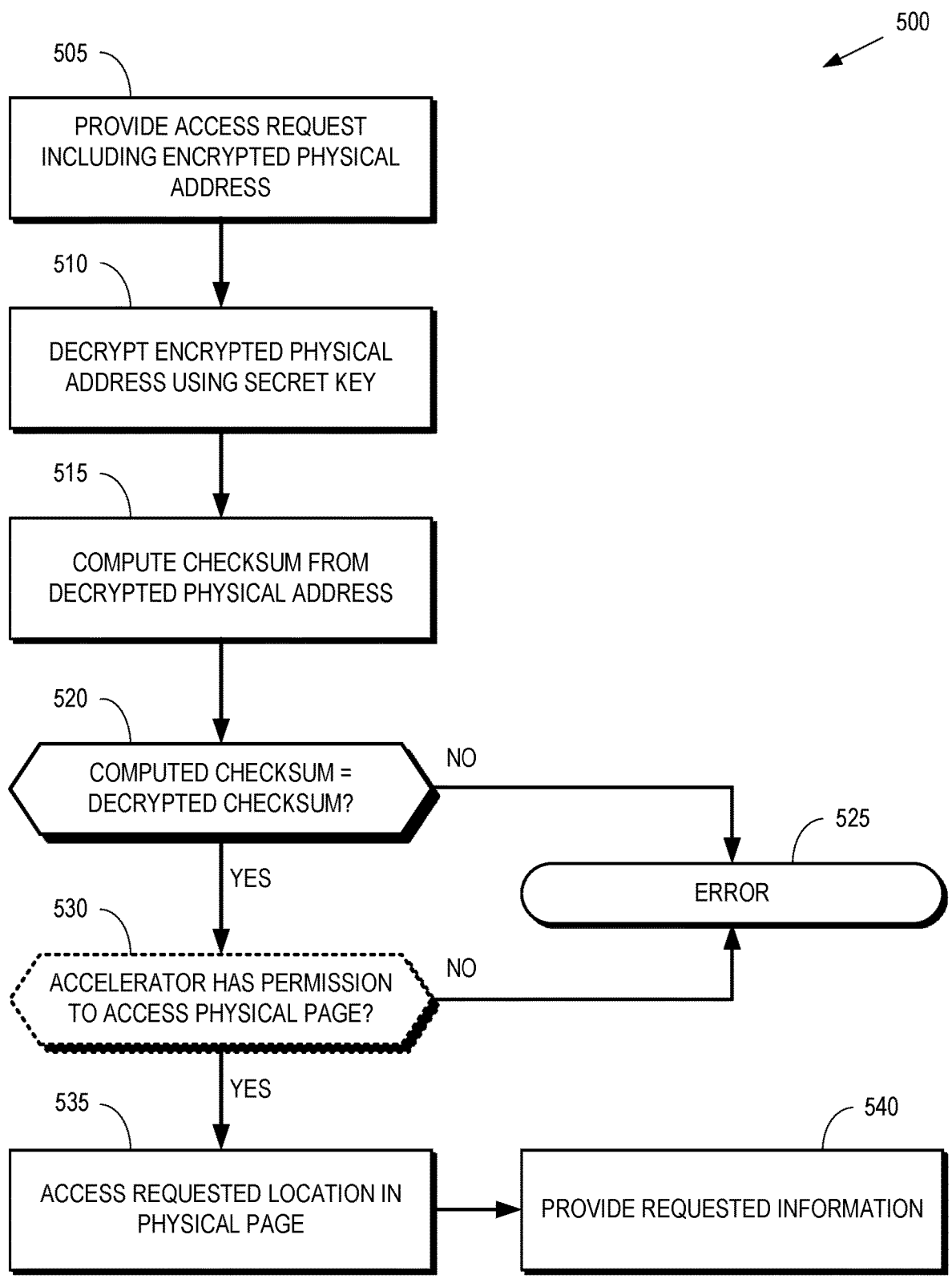
FIG. 5 is a flow diagram of a method of selectively providing a potentially un-trusted accelerator with access to a shared memory via a host processor according to some embodiments.

FIG. 5 is a flow diagram of a method 500 of selectively providing a potentially un-trusted accelerator with access to a shared memory via a host processor according to some embodiments. The method 500 is implemented in some embodiments of the processing system 100 shown in FIG. 1. For example, an accelerator such as the host processor 105 shown in FIG. 1 can use the method 500 to selectively provide access to a host memory such as the host memory 110 shown in FIG. 1 to a (potentially un-trusted) accelerator such as the accelerator 135 shown in FIG. 1.

At block 505, the accelerator provides a memory access request including an encrypted physical address to the host processor. As discussed herein, the encoded physical address can be retrieved from a TLB implemented by the accelerator using a virtual address.

At block 510, the host processor receives the memory access request and decrypts the encrypted physical address on the basis of a secret key that is known to the host processor and not known to the accelerator. The decrypted physical address includes a physical address in the host memory, as well as other information such as a checksum and (in some cases) metadata including information indicating whether the accelerator is permitted to access the location indicated by the physical address.

At block 515, the host processor computes a checksum using the physical address in the decrypted physical address and (if present) the metadata included in the decrypted physical address.

At decision block 520, the host processor compares the computed checksum to the checksum that is included in the decrypted physical address. If the two checksums are not the same, the method 500 flows to block 525 and the host processor issues an error message indicating that the accelerator is not permitted to access the physical address included in the decrypted physical address. The error message can include a negative acknowledgment or an exception. If the two checksums match, the method 500 flows to block 530.

At decision block 530, the host processor determines whether the accelerator is permitted to access the location indicated by the physical address based on the metadata included in the decrypted physical address. For example, the host processor can determine whether the type of access is permitted, whether the present request is from the same requester as indicated by a device identifier or a process identifier associated with the address translation request that caused the encrypted physical address to be generated and provided to the accelerator, whether the accelerator is permitted to access the subset of the page indicated by the physical address, and the like. Decision block 530 is an optional step that is not performed in some embodiments of the method 500, e.g., if the encrypted physical address did not include metadata. If the accelerator does not have permission, the method 500 flows to block 525 and the host processor issues an error message indicating that the accelerator is not permitted to access the physical address included in the decrypted physical address. If the accelerator does have permission, the method 500 flows to block 535.

At block 535, the host processor accesses the requested location in the physical page. For example, a memory controller in the host processor can read information from the requested location or write information to the requested location. At block 540, the host processor provides the requested information to the accelerator. For example, if the memory access request was a load request, the host processor can provide the information stored at the location in the physical page to the accelerator. For example, if the memory access request was a store request, the host processor can provide information confirming that the store was successfully performed.

Cache coherence probes can be supported by some embodiments of the processing systems disclosed herein. For example, a host processor can provide cache probes to an accelerator that include an encrypted physical address in place of the physical address included in a conventional cache probe. The accelerator can then perform cache coherence operations using the encrypted physical address. For another example, an accelerator can provide a cache probe to the host processor that includes the encrypted physical address that is used by the accelerator. The host processor can then replace the encrypted physical address in the probe with a decrypted physical address after ensuring that the probe does not violate any access permissions indicated by metadata in the encrypted physical address.

In some cases, multiple virtual addresses, possibly from different processes, map to the same physical address, which is referred to as a "synonym." In some cases, the metadata encrypted with the physical address includes process-specific information such as a process identifier. In that case, the encrypted physical addresses for virtual addresses that are synonyms can differ between processes even though they refer to the same physical address, which implies that different processes cannot share data via caches implemented by the accelerator. Synonyms can also affect cache coherence probes. If process-specific information is included in the encrypted metadata, probes transmitted from the host processor to the accelerator should be repeated for each process identifier associated with data that is cached by the accelerator. Thus, in some embodiments of systems where synonyms are expected to occur within accelerator caches, metadata may not be included in the encrypted physical address.

A malicious accelerator could retain a mapping of a virtual address to an encrypted physical address and reuse the translation to access memory in the same physical page after the virtual page has been deallocated and the physical memory page has been allocated to a different virtual memory page. Although the outcome of reusing a translation is highly dependent on the OS and system behavior, and exploitation of this type of replay attack to compromise the security of the system is not straightforward, some embodiments can further reduce this threat by requiring that deallocated physical pages can only be reallocated to another virtual page for the same process with the same degree of protection requirements until a key renewal event takes place. Physical pages that are free (e.g., not allocated to a virtual page) when the key renewal event takes place can subsequently be allocated to any virtual page of any process after the key renewal event.

Embodiments of the host memory protection scheme disclosed herein have a number of advantages over conventional practice. For example, the techniques disclosed herein enhance the security of a host memory even in the presence of untrusted accelerators while requiring little or no change to conventional accelerator design or post-accelerator interface protocols. The accelerator simply uses an encrypted physical page number instead of the plain physical page number used in conventional systems. The fact that the physical page number is encrypted can be mostly or completely transparent to the accelerator in some embodiments. For example, an accelerator can be used within embodiments of the processing systems disclosed herein by provisioning for wider physical addresses (i.e., using a larger number of bits to represent the physical addresses) in TLBs and data paths to accommodate additional metadata included in the encrypted physical addresses. Accelerators could also be configured to quickly identify local physical pages (e.g., pages that are stored in the accelerator memory 140 shown in FIG. 1) from host memory pages (e.g., pages that are stored in the host memory 110) without relying on specific physical address ranges because membership in such ranges may not be readily evident from encrypted physical page numbers. For example, an additional bit in the TLB entry can be set to a first value to indicate that a page resides in the accelerator memory or a second value to indicate that the page resides in the host memory.

In some embodiments, the apparatus and techniques described above are implemented in a system comprising one or more integrated circuit (IC) devices (also referred to as integrated circuit packages or microchips), such as the processing system described above with reference to FIGS. 1-5. Electronic design automation (EDA) and computer aided design (CAD) software tools can be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device can be stored in and accessed from the same computer readable storage medium or a different computer readable storage medium.

A computer readable storage medium can include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium can be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above can implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium can be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
   receiving, at a host processor from an accelerator, an address translation request including a virtual address in a virtual address space that is shared by the host processor and the accelerator;
encrypting, at the host processor, a physical address in a host memory indicated by the virtual address in response to the accelerator being permitted to access the physical address;
providing, from the host processor to the accelerator, the encrypted physical address; and
storing, at a translation lookaside buffer associated with the accelerator, a mapping of the virtual address to the encrypted physical address.

2. The method of claim 1, wherein encrypting the physical address comprises encrypting the physical address on the basis of a secret key that is known by the host processor and not known by the accelerator.

3. The method of claim 2, further comprising:
receiving, at the host processor and from the accelerator, a memory access request including the encrypted physical address;
decrypting the encrypted physical address using the secret key to form a decrypted physical address; and
selectively accessing a location in the host memory indicated by the decrypted physical address depending upon whether the accelerator is permitted to access the location indicated by the decrypted physical address.

4. The method of claim 3, further comprising:
computing a first checksum based on the physical address; and
appending the first checksum to the physical address prior to encrypting the physical address and the first checksum.

5. The method of claim 4, wherein selectively accessing the location in the host memory comprises:
computing a second checksum based on the decrypted physical address; and
accessing the location in the host memory in response to the second checksum being the same as a third checksum included in the decrypted physical address.

6. The method of claim 4, further comprising:
accessing first metadata indicating permissions associated with the accelerator; and
appending the first metadata to the physical address prior to encrypting the physical address and the first metadata.

7. The method of claim 6, wherein selectively accessing the location in the host memory comprises accessing the location in the host memory in response to second metadata in the decrypted physical address indicating that the accelerator is permitted to access the location indicated by the decrypted physical address.

8. The method of claim 1, further comprising:
providing, from the host processor to the accelerator, at least one of a translation lookaside buffer invalidation request including the encrypted physical address or a cache probe including the encrypted physical address.

9. A method comprising:
providing, from an accelerator to a host processor, an address translation request including a virtual address in a virtual address space that is shared by the host processor and the accelerator;
receiving, at the accelerator, an encrypted physical address in a host memory indicated by the virtual address in response to the accelerator being permitted to access the encrypted physical address; and
storing, at a translation lookaside buffer associated with the accelerator, a mapping of the virtual address to the encrypted physical address.

10. The method of claim 9, further comprising:
providing, from the accelerator to the host processor, a memory access request including the encrypted physical address; and
selectively receiving access to a location in the host memory indicated by the encrypted physical address depending upon whether the host processor determines that the accelerator is permitted to access the location indicated by the encrypted physical address.

11. The method of claim 9, further comprising:
receiving, at the accelerator from the host processor, at least one of a translation lookaside buffer invalidation request including the encrypted physical address or a cache probe including the encrypted physical address.

12. An apparatus comprising:
a host processor;
a host memory that is configured to be mapped to a virtual address space that is shared by the host processor and an accelerator, wherein the host processor is configured to:
receive an address translation request including a virtual address in the virtual address space,
encrypt a physical address in the host memory indicated by the virtual address in response to the accelerator being permitted to access the physical address, and
provide the encrypted physical address to the accelerator; and
a translation lookaside buffer associated with the accelerator and configured to store a mapping of the virtual address to the encrypted physical address.

13. The apparatus of claim 12, wherein the host processor is configured to:
encrypt the physical address on the basis of a secret key that is known by the host processor and not known by the accelerator.

14. The apparatus of claim 13, wherein the host processor is further configured to:
receive a memory access request including the encrypted physical address,
decrypt the encrypted physical address using the secret key to form a decrypted physical address, and
selectively access a location in the host memory indicated by the decrypted physical address depending upon whether the accelerator is permitted to access the location indicated by the decrypted physical address.

15. The apparatus of claim 14, wherein the host processor is configured to:
compute a first checksum based on the physical address and append the first checksum to the physical address prior to encrypting the physical address and the first checksum.

16. The apparatus of claim 15, wherein the host processor is configured to:
compute a second checksum based on the decrypted physical address and access the location in the host memory in response to the second checksum being the same as a third checksum included in the decrypted physical address.

17. The apparatus of claim 14, wherein the host processor is configured to:
access first metadata indicating permissions associated with the accelerator and append the first metadata to the physical address prior to encrypting the physical address and the first metadata.

18. The apparatus of claim 17, wherein the host processor is configured to:

access the location in the host memory in response to second metadata in the decrypted physical address indicating that the accelerator is permitted to access the location indicated by the decrypted physical address.

19. The apparatus of claim 12, further comprising:

the accelerator, wherein the accelerator is configured to store a mapping of the virtual address to the encrypted physical address.

20. The apparatus of claim 19, wherein the host processor is configured to:

provide at least one of a translation lookaside buffer invalidation request including the encrypted physical address or a cache probe including the encrypted physical address.

* * * * *